(12) United States Patent
Karaki et al.

(10) Patent No.: US 11,363,631 B2
(45) Date of Patent: Jun. 14, 2022

(54) DYNAMIC START FOR TRANSMISSION ON UNLICENSED SPECTRUM

(71) Applicant: TELEFONAKTIEBOLAGET LM ERICSSON (PUBL), Stockholm (SE)

(72) Inventors: Reem Karaki, Aachen (DE); Havish Koorapaty, Saratoga, CA (US); Jung-Fu Cheng, Fremont, CA (US); Sorour Falahati, Stockholm (SE); Yu Yang, Solna (SE); Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 427 days.

(21) Appl. No.: 16/467,007

(22) PCT Filed: Apr. 2, 2018

(86) PCT No.: PCT/IB2018/052272
§ 371 (c)(1),
(2) Date: Jun. 5, 2019

(87) PCT Pub. No.: WO2018/185641
PCT Pub. Date: Oct. 11, 2018

(65) Prior Publication Data
US 2019/0394802 A1 Dec. 26, 2019

Related U.S. Application Data

(60) Provisional application No. 62/481,073, filed on Apr. 3, 2017.

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 72/0446* (2013.01); *H04L 5/0007* (2013.01)

(58) Field of Classification Search
CPC ............... H04L 5/0007; H04W 16/14; H04W 72/0446; H04W 74/0808
(Continued)

(56) References Cited

U.S. PATENT DOCUMENTS

| | | | |
|---|---|---|---|
| 2016/0143014 A1* | 5/2016 | Mukherjee | H04L 5/0039 370/330 |
| 2017/0331577 A1* | 11/2017 | Parkvall | H04B 7/0452 |
| 2018/0077581 A1* | 3/2018 | Ahn | H04W 74/08 |

FOREIGN PATENT DOCUMENTS

| | | |
|---|---|---|
| WO | 2016/122249 A2 | 8/2016 |
| WO | 2017/052804 A1 | 3/2017 |

OTHER PUBLICATIONS

Zte et al., "About Mini-Slots", 3FPP TSG RAN WG1 Meeting #87, R1-1611286, Nov. 14-18, 2016.
(Continued)

*Primary Examiner* — Mohammad S Anwar
(74) *Attorney, Agent, or Firm* — Withrow & Terranova, PLLC

(57) ABSTRACT

A radio access node or wireless device performs LBT on a channel and dynamically determines a transmission starting point on the channel, based on whether the LBT succeeds before or after a slot boundary between a slot n and a previous slot n−1. In response to determining that the LBT succeeds before the slot boundary, a transmission scheduled
(Continued)

for the slot n is extended to start earlier, in the previous slot n−1. Otherwise, in response to determining that the LBT succeeds after the slot boundary, either a transmission scheduled for a next slot n+1 is extended to start earlier, in the slot n, or a transmission scheduled for the a second mini-slot of the slot n is extended to start earlier, in a first mini-slot of the slot n.

16 Claims, 15 Drawing Sheets

(51) Int. Cl.
  *H04W 72/04* (2009.01)
  *H04L 5/00* (2006.01)
(58) Field of Classification Search
  USPC .......................................................... 370/329
  See application file for complete search history.

(56) References Cited

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211 V12.3.0, Sep. 2014.
3rd Generation Partnership Project; Technical Specification Group Radio Access Network; Evolved Universal Terrestrial Radio Access (E-UTRA); Physical layer procedures (Release 12), 3GPP TS 36.213, V12.3.0, Sep. 2014.
3rd Generation Partnership Project; Technical Specification Group Radio Access Network; Evolved Universal Terrestrial Radio Access (E-UTRA); Radio Resource Control (RRC), (Release 12) 3GPP TS 36.212, V12.6.0, Mar. 2015.
3rd Generation Partnership Project; Technical Specification Group Radio Access Network; Evolved Universal Terrestrial Radio Access (E-UTRA); Medium Access Control (MAC) protocol specification (Release 12), 3GPP TS 36.321, V12.1.0, Mar. 2014.
Ericsson et al., "MCS Table for Initial Partial TTI in LAA", 3GPP TSG-RAN WG1#84bis, R1-163508, Apr. 11-15, 2016.

* cited by examiner

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $(1+X) \cdot 2192 \cdot T_s$ | $(1+X) \cdot 2560 \cdot T_s$ | $7680 \cdot T_s$ | $(1+X) \cdot 2192 \cdot T_s$ | $(1+X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2+X) \cdot 2192 \cdot T_s$ | $(2+X) \cdot 2560 \cdot T_s$ |
| 5 | $6592 \cdot T_s$ | $(2+X) \cdot 2192 \cdot T_s$ | $(2+X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | - | - | - |
| 9 | $13168 \cdot T_s$ | | | - | - | - |

*FIG. 5B*

DYNAMIC START FOR TRANSMISSION ON UNLICENSED SPECTRUM

RELATED APPLICATIONS

This application is a national stage application of International Patent Application No. PCT/IB2018/052272, filed Apr. 2, 2018, which claims the benefit of U.S. provisional patent application Ser. No. 62/481,073, filed Apr. 3, 2017, the disclosures of which are hereby incorporated herein by reference in their entirety.

TECHNICAL FIELD

The disclosed subject matter relates generally to telecommunications. Certain embodiments relate more particularly to concepts such as Licensed-Assisted Access (LAA) or Listen-Before Talk (LBT) and dynamically determining a transmission starting point.

BACKGROUND

3GPP work on "Licensed-Assisted Access" (LAA) will allow Long Term Evolution (LTE) equipment to operate in unlicensed radio spectrum. Candidate bands for unlicensed spectrum for LTE include 5 GHz, 3.5 GHz, etc. The unlicensed spectrum is used to complement the licensed spectrum or to be used without the licensed spectrum.

When the unlicensed spectrum is used as a complement to the licensed spectrum, devices connect in the licensed spectrum (primary cell or PCell) and use carrier aggregation (CA) to benefit from additional transmission capacity in the unlicensed spectrum (secondary cell or SCell). The CA framework allows aggregation of two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink performance is particularly hampered. Uplink transmission is becoming more and more important with user-centric applications and the need for pushing data to the cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike in LTE, Wi-Fi terminals can asynchronously access the medium and thus show better uplink performance characteristics, especially in congested network conditions.
Operation in LTE LTE uses orthogonal frequency division multiplexing (OFDM) in the downlink and discrete Fourier transform (DFT)-spread OFDM (also referred to as single-carrier frequency division multiple access, FDMA) in the uplink.

The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length $T_{subframe}=1$ ms, as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, for example, the control information. A downlink system with CFI=3 OFDM symbols as control is illustrated in FIG. 3. The reference symbols shown in FIG. 3 are cell-specific reference symbols (CRS) and are used to support multiple functions, including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the Physical Uplink Shared Channel (PUSCH), uplink control information in the Physical Uplink Control Channel (PUCCH), and various reference signals such as demodulation reference signals (DMRS) and sounding reference signals (SRS). DMRS are used for coherent demodulation of PUSCH and PUCCH data, whereas SRS is not associated with any data or control information, but is generally used to estimate the uplink channel quality for purposes of frequency-selective scheduling. An example uplink subframe is shown in FIG. 4. Note that uplink DMRS and SRS are time-multiplexed into the uplink subframe, and SRS are always transmitted in the last symbol of a normal uplink subframe. The PUSCH DMRS is transmitted once every slot for subframes with a normal cyclic prefix, and is located in the fourth and eleventh SC-FDMA symbols.

From LTE Rel-11 onwards, downlink or uplink resource assignments can also be scheduled on the enhanced Physical Downlink Control Channel (EPDCCH). For Rel-8 to Rel-10 only, the PDCCH is available. Resource grants are UE-specific and are indicated by scrambling the downlink control information (DCI) Cyclic Redundancy Check (CRC) with the UE-specific Cell Radio Network Temporary Identifier (C-RNTI) identifier. A unique C-RNTI is assigned by a cell to every UE associated with it, and can take values in the range 0001-FFF3 in hexadecimal format. A UE uses the same C-RNTI on all serving cells.

Scheduled LTE Uplink Scheme

In LTE, the uplink access is typically controlled by eNB, i.e., scheduled. In this case, the UE would report to the eNB when data is available to be transmitted, for example, by sending a scheduling request message (SR). Based on this, the eNB would grant the resources and relevant information to the UE, in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the corrected size of data.

In more detail, every time new data arrives at the UE's empty buffer, the following procedure should be performed. First, using PUCCH, the UE informs the network that it needs to transmit data by sending a Scheduling Request (SR) indicating that it needs uplink access. UE has aperiodic timeslots for SR transmissions (typically on a 5, 10, or 20 ms interval). Once the eNB receives the SR request bit, it responds with a small "uplink grant" that is just large enough to communicate the size of the pending buffer. The reaction to this request typically takes 3 ms. After the UE receives and processes its first uplink grant (takes about 3 ms), it typically sends a BSR that is a MAC Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321. The eNB receives the BSR message, allocates the necessary uplink resources and sends back another uplink grant that will allow the device to drain its buffer.

Adding it all up, about 16 ms (plus time to wait for PUCCH transmission opportunity) of delay can be expected between data arrival at the empty buffer in the UE and reception of this data in the eNB.

When the UE is not Radio Resource Control (RRC) connected in LTE or has lost its uplink synchronization because it did not transmit or receive anything for a certain time, the UE would use the random access procedure to connect to the network, obtain synchronization and also send the SR. If this is the case, the procedure until the data can be sent would take even longer than the SR transmission on PUCCH.

DCI for Scheduling LTE Uplink Transmission

In the LTE system, the transmission formats and parameters are controlled by the eNB. The DCI typically contains: resources allocated for uplink transmission (including whether frequency hopping is applied); the modulation and coding scheme; redundancy versions; a new data indicator; a transmit power control command; and information about DMRS. In the case of cross-carrier scheduling, the DCI contains the target carrier index. The DCI can also contain other applicable control information on uplink transmissions.

The DCI is first protected by 16-bit CRC. The CRC bits are further scrambled by the UE-assigned identity Cell Radio Network Temporary Identifier (C-RNTI). The DCI and scrambled CRC bits are further protected by convolutional coding. The encoded bits are transmitted from the eNB to UE using either PDCCH or EPDCCH.

Configuration of a Special Subframe

A special subframe is defined for frame structure 2 for LTE and consists of three fields: DwPTS, GP and UpPTS. This frame structure is illustrated in FIG. 5A. The configuration of the special subframe is listed in the table shown by FIG. 5B. In the table, X is the number of additional SC-FDMA symbols in UpPTS provided by the higher layer parameter srs-UpPtsAdd, if configured. Otherwise, X is equal to 0. The UE is not expected to be configured with two additional UpPTS SC-FDMA symbols for special subframe configurations {3, 4, 7, 8} for normal cyclic prefix in downlink and special subframe configurations {2, 3, 5, 6} for extended cyclic prefix in downlink, and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

LAA to Unlicensed Spectrum Using LTE

Up to now, the spectrum used by LTE is dedicated to LTE. This has the advantage in that an LTE system does not need to care about the coexistence issue and spectrum efficiency can be maximized. However, the spectrum allocated to LTE is limited, which cannot meet the ever-increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to coexist with other systems such as IEEE 802.11 (Wi-Fi). Operating LTE in the same manner in unlicensed spectrum as in licensed spectrum can seriously degrade the performance of Wi-Fi, as Wi-Fi will not transmit once it detects the channel is occupied.

Furthermore, one way to utilize the unlicensed spectrum reliably is to transmit essential control signals and channels on a licensed carrier. That is, as shown in FIG. 6, a UE is connected to a PCell in the licensed band and one or more SCells in the unlicensed band. In this application, a secondary cell in unlicensed spectrum is denoted as LAA secondary cell (LAA SCell). In the case of standalone operation, as in MulteFire™, no licensed cell is available for uplink control signal transmissions.

SUMMARY

An eNB needs to consider several factors when scheduling transmissions on subframes, including channel state information (CSI) feedback, buffer sizes, quality of service requirements, retransmissions, control stratum needs, etc. The eNB needs to select a combination of UEs and the corresponding transport block sizes, the modulation levels and the physical resource block (PRB) allocations. This is a complicated and necessary step that enables the high quality of services provided to LTE users. The eNB also needs to carry out L1 and L2 processing. L2 processing includes protocol processing, control stratum processing, and buffer memory management to ensure data integrity. L1 processing includes CRC encoding of transport blocks, CRC encoding, channel encoding and rate matching of coded blocks, scrambling, modulation mapping, layer mapping and precoding, RS and other signal insertion. This processing also includes discrete Fourier transforms (DFT), possible windowing, filtering or other processing.

It is a significant increase in complexity to change the transport block size (TBS) based on the LBT outcome. Alternatively, in Rel-13, a UE can be configured with two possible starting points {0,7} OFDM Symbol. L1 processing can adapt the same TBS into a different amount of radio resources to accommodate multiple data transmission starting points based on the LBT outcome. Depending on the used starting point, the number of available resources is different and hence a different coding rate will have to fit the same scheduled TBS.

If LBT fails at the downlink transmission latest starting point, the eNB will drop the transmission and transmit later on. This leads to a delay of the downlink transmission and impacts the downlink performance. The flexibility of accessing the channel is limited as compared to other technologies that do not follow fixed frame structure, such as Wi-Fi. The same problem exists at UE side for UL transmission on unlicensed spectrum.

Embodiments of the disclosed subject matter may provide advantages over conventional techniques and technologies. These embodiments provide support for a dynamic starting point for downlink and uplink transmission, including on unlicensed spectrum. This allows an eNB to have the flexibility needed to transmit on the downlink at different starting positions based on an LBT outcome (LBT is successful if the clear channel assessment has a positive outcome). The UE, in turn, has flexibility to transmit on the uplink at different starting positions based on an LBT outcome. The methods disclosed herein can be applied to LAA/New Radio (NR)-U/MulteFire™ or other technologies operating transmission on unlicensed spectrum. While transmission frames are discussed in some examples with reference to subframes (and slots within subframes) in the context of LTE, these subframes can more generally be referred to as slots (in consideration of the terminology for NR or other technologies). That is, to ease explanation, slots may correspond to subframes, and mini-slots may correspond to the slots or partial subframes within a subframe.

According to some embodiments, a method by a network node (e.g., radio access node or wireless communication device) includes performing an LBT procedure on a channel and dynamically determining a transmission starting point on the channel, based on whether the LBT succeeds before or after a slot boundary between a slot n and a previous slot n−1. The dynamically determining includes, in response to determining that the LBT succeeds before the slot boundary, extending a transmission scheduled for the slot n to start earlier, in the previous slot n−1. Otherwise, the dynamically determining includes, in response to determining that the LBT succeeds after the slot boundary, performing either one of: discarding any transmission scheduled for the slot n and extending a transmission scheduled for a next slot n+1 to start earlier, in the slot n; and, in response to determining that the LBT succeeds before a mini-slot boundary between first and second mini-slots in the slot n, extending a transmission scheduled for the second mini-slot to start earlier, in the first mini-slot.

According to some embodiments, a network node includes communication circuitry configured for sending and receiving transmissions and processing circuitry operatively associated with the communication circuitry. The processing circuitry is configured to perform an LBT procedure on a channel and dynamically determine a transmission starting point on the channel, based on whether the LBT succeeds before or after a slot boundary between a slot n and a previous slot n−1. The processing circuitry is configured to dynamically determine the transmission starting point by, in response to determining that the LBT succeeds before the slot boundary, extending a transmission scheduled for the slot n to start earlier, in the previous slot n−1. Otherwise, the processing circuitry is configured to, in response to determining that the LBT succeeds after the slot boundary, perform either one of: discarding any transmission scheduled for the slot n and extending a transmission scheduled for a next slot n+1 to start earlier, in the slot n; and in response to determining that the LBT succeeds before a mini-slot boundary between first and second mini-slots in the slot n, extending a transmission scheduled for the second mini-slot to start earlier, in the first mini-slot.

Further aspects of the present invention are directed to an apparatus, computer program products or computer readable storage medium corresponding to the methods summarized above and functional implementations of the above-summarized network node.

The embodiments described herein overcome the shortcomings associated with conventional techniques. Before downlink transmission starts, several functions and procedures are performed by the transmission point. Support of multiple starting and ending positions for flexible and efficient channel access on unlicensed spectrum can reduce transmission delay and increase the overall system performance.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

The drawings illustrate selected embodiments of the disclosed subject matter. In the drawings, like reference labels denote like features.

FIG. 5B illustrates a table for a configuration of a special subframe in the frame structure of FIG. 5A.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

Certain embodiments of the disclosed subject matter provide methods that support dynamic starting positions for downlink (DL) and uplink (UL) transmission on unlicensed spectrum.

The description below assumes LAA operation as an example. However, the described methods can also be applied to LAA/NR-U/MulteFire™ or other technologies operating transmission on unlicensed spectrum.

DL Starting Point

According to an embodiment, the eNB can access the channel and start the transmission at the boundary of any OFDM symbol or subset of OFDM symbols. In some contexts, the eNB is configured to start the transmission only on a subframe/slot or slot/mini-slot boundary. The mini-slot boundary can mark the start of control signaling for the subframe/slot in which the control signaling is transmitted. In the present context, the control signaling (e.g., PDCCH) location can be assumed to be fixed to certain starting points (slot, subframe, or possibly new positions). Furthermore, the eNB is not restricted to those fixed positions when accessing the channel. The eNB transmission can start at an earlier time, i.e., before the control signaling is transmitted. This can be achieved by transmitting an extended copy of the data and/or control signaling planned for a certain subframe/slot in an earlier subframe/slot.

Control Signaling Fixed at Slot Boundary

Figure 1:
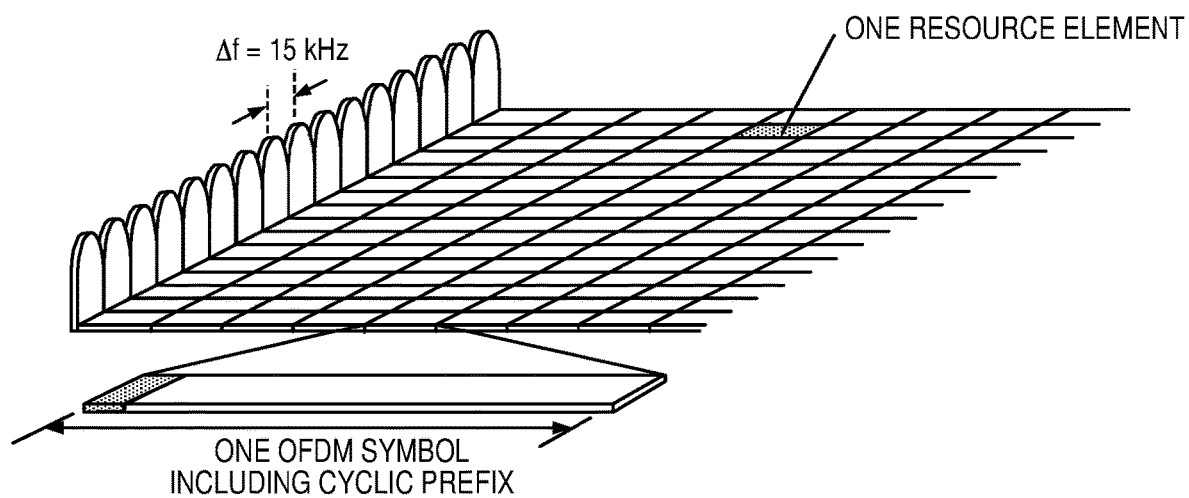
FIG. 1 illustrates the LTE downlink physical resource.
Figure 2:
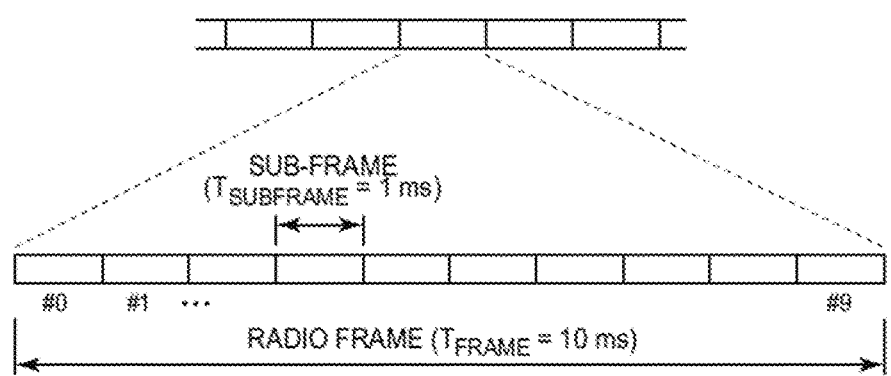
FIG. 2 illustrates the LTE time-domain structure.
Figure 3:
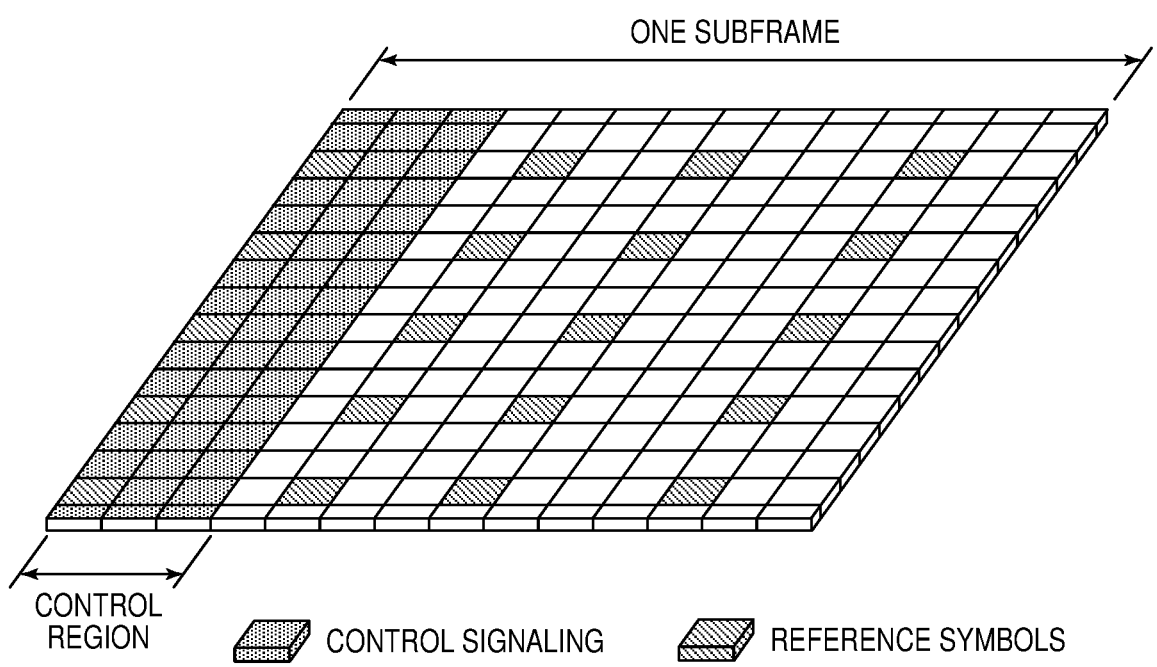
FIG. 3 illustrates a downlink subframe.
Figure 4:
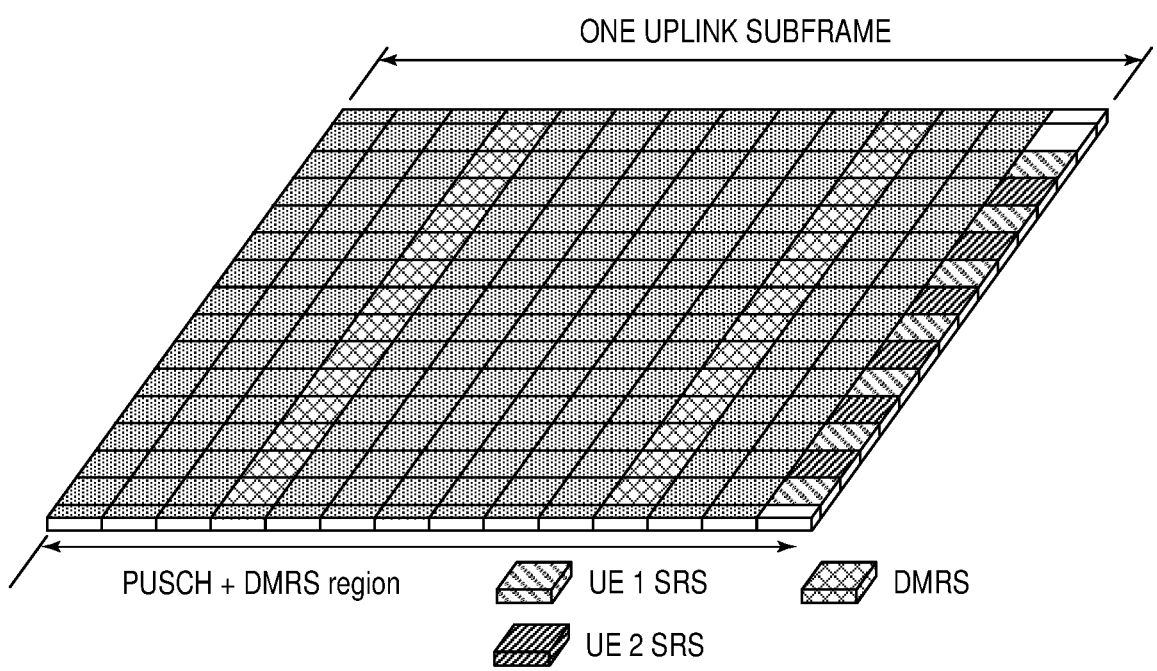
FIG. 4 illustrates an uplink subframe.
Figure 5A:
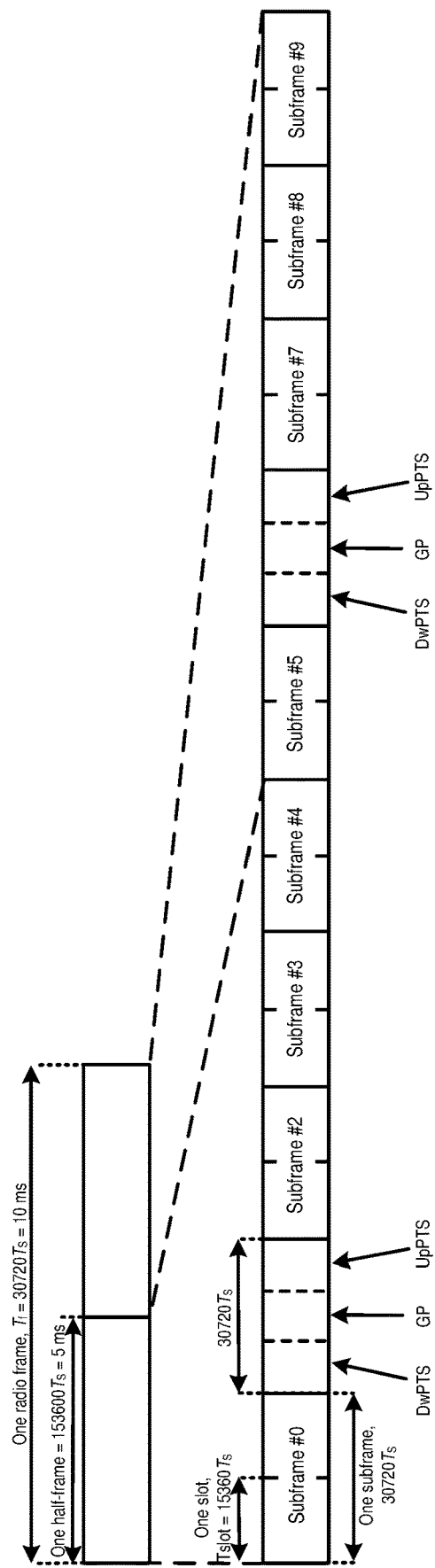
FIG. 5A illustrates a frame structure type 2 (for 5 ms switch-point periodicity).
Figure 6:
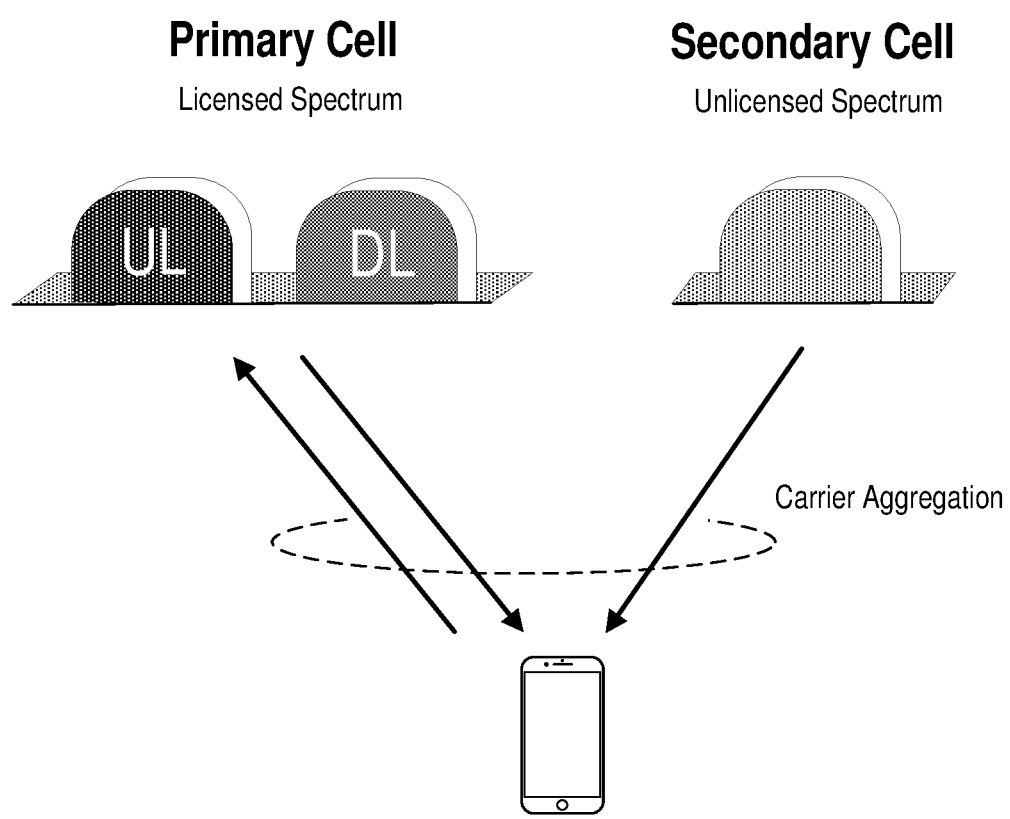
FIG. 6 illustrates licensed-assisted access (LAA) to unlicensed spectrum using LTE carrier aggregation.
Figure 7A:
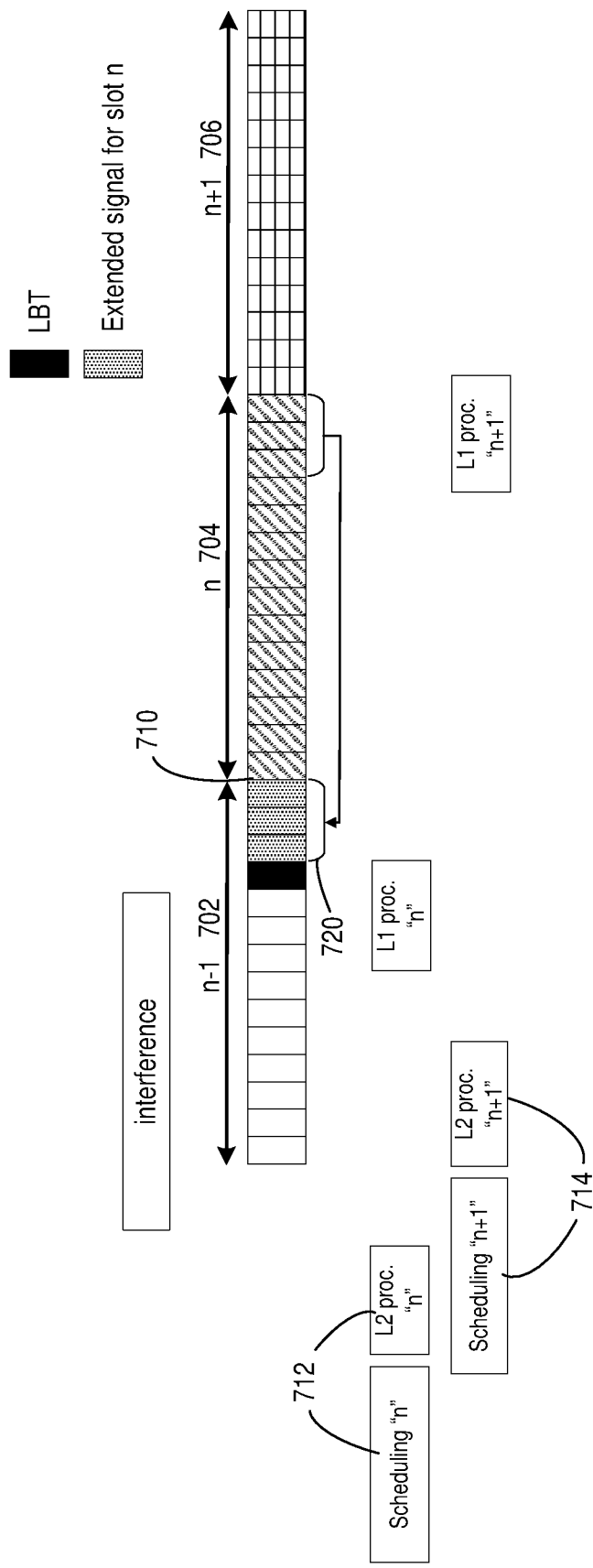
FIGS. 7A, 7B and 7C illustrate examples of starting transmission at any OFDM symbol boundary.
Figure 12:
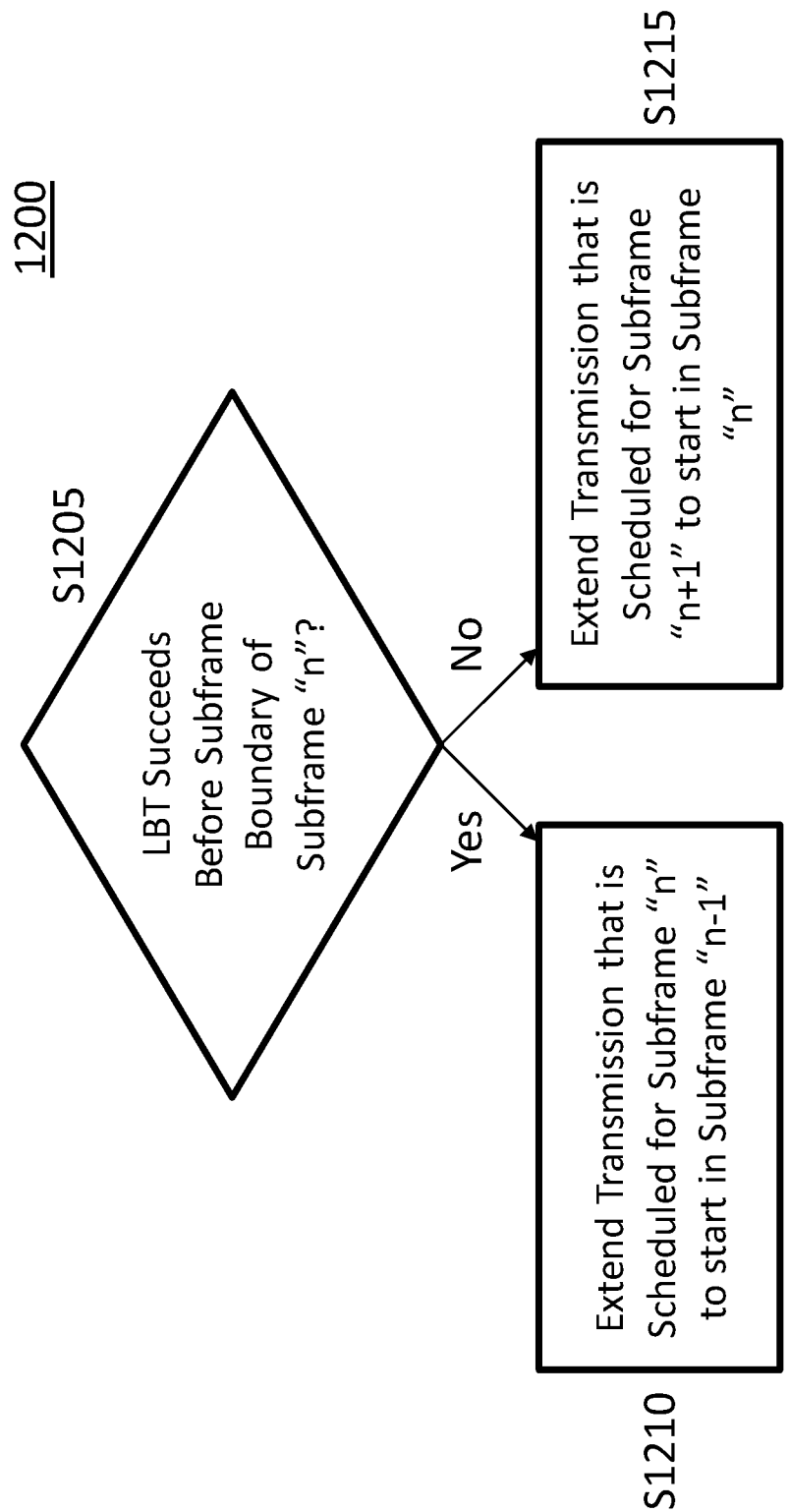
FIG. 12 illustrates a method of operating a wireless communication device or a radio access node, according to some embodiments.

For example, the eNB starts early preparation for the future transmission. In fact, as shown in the diagram of FIG. 7A, the eNB may finalize scheduling and L2 processing 712, 714 for slots (subframes in LTE) "n" 704 and "n+1" 706 at least before the boundary 710 before slot "n" 704. FIG. 12 illustrates an example method for this situation in the context of LTE subframes, where decision stage S1205 includes determining whether LBT succeeds before the subframe boundary 710. If the LBT succeeds before the subframe boundary, the eNB extends the transmission that is scheduled for subframe n to start in earlier subframe n−1 (stage S1210). As shown in FIG. 7A, the extension 720 can be formed by copying part of the transmission scheduled for subframe/slot n 704 to occupy the channel for the time in the earlier subframe/slot n−1 702 until the subframe/slot boundary 710.

Figure 7B:
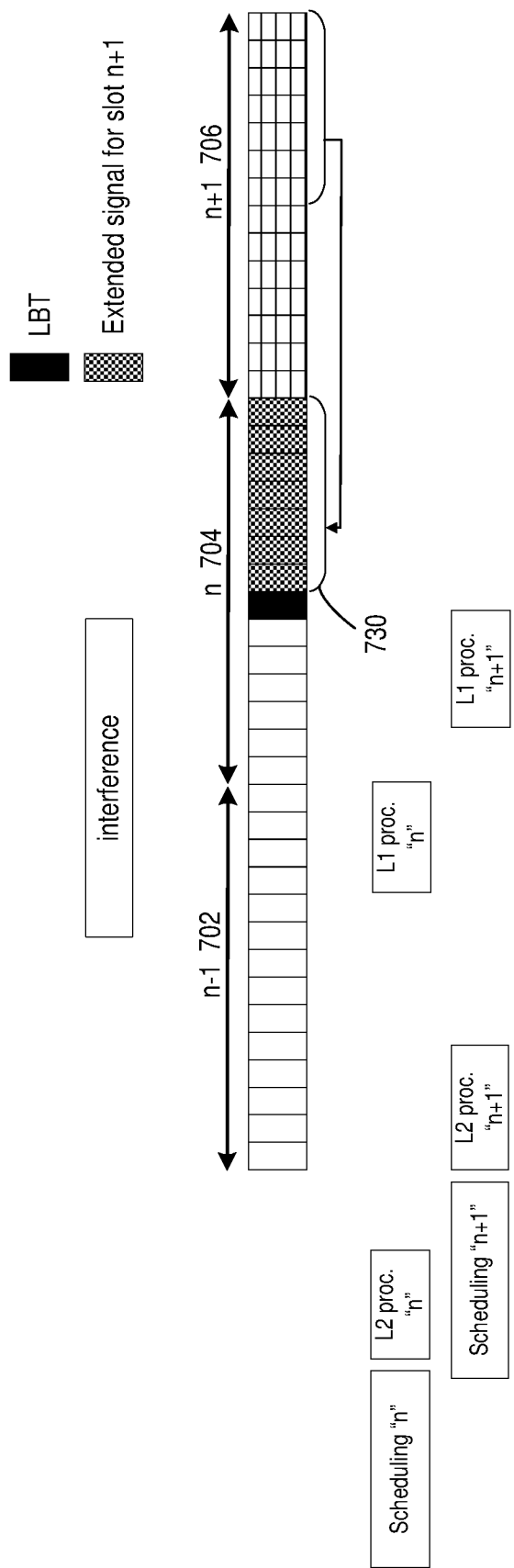

If the LBT succeeds after the subframe boundary, the eNB discards the planned transmission for subframe n and extends the prepared transmission for later subframe n+1 to start in subframe n (stage S1215). As shown in FIG. 7B, the extension 730 can be formed by copying part of the later subframe/slot n+1 706 transmission to occupy the remaining duration of subframe/slot n 704. The UE can use the extended signal to enhance the robustness of the received signal.

Depending on the eNB capability and the L1 processing delay, the transmission can start at any OFDM symbol ("OS") or subset of OFDM symbols within a slot. According to this embodiment, the copied part can be the starting "x" number of OFDM symbols of the transmission of the next slot to increase the robustness against a collision that might happen due to aligned back-off. The copied part can also be the ending "X" OS of the transmission of the next slot to increase the robustness of the data transmissions on PDSCH. The copied part may also be the preconfigured "X" number of OSs of the transmission of the next slot containing a reference signal (e.g., CRS or DMRS) to facilitate blind detection of the starting position.

Control Signaling Fixed to Mini-Slot Boundary

The same concept can be applied even when the Rel-13 partial subframe (or mini-slot) is configured (starting at 0 and 7th OS). The different possible cases are covered below.

If the LBT succeeds before the boundary of slot n 704, the eNB extends the transmission that is scheduled for slot n 704 to start in the slot n−1 702. The extension 720 can be formed by copying part of the transmission scheduled for slot n 704 to occupy the channel for the time until the slot boundary. This was shown by FIG. 7A.

Figure 7C:
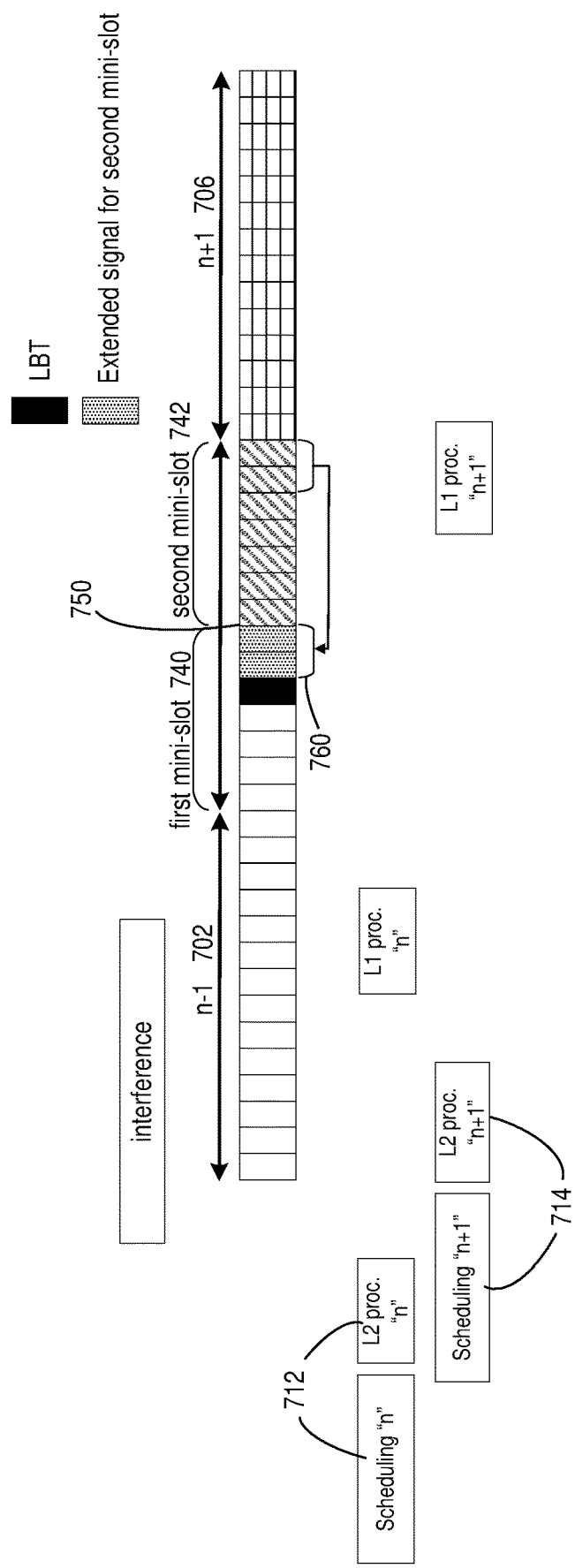

However, in this embodiment, if the LBT succeeds after the boundary of slot n 704, the eNB can still attempt to transmit the same TBS with a higher coding rate or a higher modulation order in the second mini-slot 742 of the same slot n 704 (see FIG. 7C). If the LBT succeeds before the mini-slot boundary 750, the planned transmission for the second mini-slot 742 of slot n 704 is extended to start in the first mini-slot 740 of slot n 704. The extension 760 can be formed by copying part of the transmission prepared for the second mini-slot 742 of slot n to occupy the remaining duration of the first mini-slot 740.

If the LBT succeeds after the boundary of the second mini-slot 742, the eNB discards the planned transmission for the second mini-slot 742 of slot n 704 and extends the prepared transmission for slot n+1 706 to start in slot n 704. The extension can be formed by copying part of the slot n+1 706 transmission to occupy the remaining duration of slot n 704.

Multiple Starting Points within the Slot

The same concept can be reused even if more starting points are allowed for new transmissions. In one embodiment, the UE can be informed about the dynamic transmission starting point in slot n 704 via signaling in slot n+1 706 by a new field added to the DCI. For example, if the starting point at a slot boundary is configured, 4 bits are needed to represent 13 values (second until 14th OS). If slot-based transmission is configured, only 3 bits are needed to represent 6 values (2 to 6 symbols). As a further example, a single bit can be used to indicate the presence/absence of extended signals in slot n.

In another embodiment, the starting point is signaled via a common or broadcast signal, such as the common PDCCH. For example, if the starting point at a slot boundary is configured, 4 bits are needed to represent 13 values (second until 14th OS). If slot-based transmission is configured, only 3 bits are needed to represent 6 values (2 to 6 symbol). As a further example, a single bit can be used to indicate the presence/absence of extended signals in slot n 704.

In another embodiment, the eNB starts the extended part of the signal using a symbol containing a reference signal. Accordingly, the UE can mark the start of the transmission by the presence of a cell-specific reference signal (CRS) in the partial subframe or mini-slot. This can be configured by higher layer signaling.

The UE needs to be informed if the extended part of the signal corresponds to the first or last X number of OSs of the slot. The latter can be done by higher layer configuration, or by one bit added to the DCI. If the extended part of the signal corresponds to the X number of OSs of the slot containing a reference signal, it shall be configured by higher layer signaling.

In a further embodiment, the UE can perform autonomous detection of the extended signals by any of various methods. One method involves the UE detecting the presence of the extended signals by comparing the received signals between slots or between mini-slots. The comparison may be based on: a correlation of the received modulation symbols; a Euclidean distance between the received modulation symbols; a correlation of the bit soft values after soft demodulation; a Euclidean distance between the bit soft values after soft demodulation; a correlation of hard bit decisions from demodulation; and/or a Hamming distance between hard bit decisions from demodulation.

The UE can detect the presence of CRS and recover at least the part of the extended signal, starting from the OFDM symbol containing the detected CRS. The UE can also detect the presence of the extended signals by energy detection.

The UE can buffer the received samples for slot n 704. If the UE detects DCI in slot n+1 706, based on the field in the DCI, the UE can determine how many symbols in slot n 704 can be considered as the extension of the signal in slot n 704 and use that for proper operation, such as enhanced robustness.

In some embodiments related to DL transmissions, special consideration is made for extended copying of subframes that carry synchronization sequences, for example, the primary synchronization signal (PSS) and the secondary synchronization signal (SSS). In LAA and MulteFire™ (MF), PSS/SSS occur in symbols 5 and 6 of subframes 0 and 5 in regular subframes outside of the DRS. Therefore, for the case where LBT succeeds in subframe 9 or subframe 4, copying the PSS/SSS over from the next DL subframe can lead to confusion for UEs that are trying to perform initial cell acquisition or radio resource measurement (RRM) measurements, since they will see PSS/SSS in consecutive subframes. One example solution for this case is to exclude the PSS/SSS from the center 6 resource blocks (RBs) of the copied portion when extending the subframe. Another example solution is to use a different root index for the PSS compared to the existing indices used in LAA/MF.

In another aspect, special consideration is made for extended copying of DRS subframes. In MF, the downlink reference signal (DRS) contains four symbols of PSS/SSS and six non-contiguous symbols of PBCH in a particular order. In order to limit impact on legacy MF UEs, one solution is for the PSS/SSS and/or physical broadcast channel (PBCH) portions to be excluded from the copied over portion of the DRS subframe if multiple starting points are supported for the DRS. Another example solution is to utilize the extended symbols to further lower the code rate and increase coverage of the PBCH for UEs capable of decoding the additional symbols.

The embodiments described herein enable efficient scheduling and transmission when multiple starting/ending positions is supported.

UL Starting Point

The same concept can be applied for UL transmission. It can be applied for both scheduled UL transmission and autonomous UL transmission. The UE can transmit an extended copy of the data and/or control signaling planned for a certain slot n 704 in an earlier slot n−1 702 based on an LBT outcome.

When a UE is to transmit a slot n 704 in which the last DFTS-OFDM symbol is to be left empty, and the UE gains access to the channel X number of DFTS-OFDM symbols prior to the slot boundary 710, the UE can transmit the ending X number of DFTS-OFDM symbols of the slot n 704 in the previous slot n−1 702, where the ending X number of DFTS-OFDM symbols are computed assuming that an SRS signal was to be transmitted in the last DFTS-OFDM symbol of the slot n 704.

In one example, the UE informs the eNB about the start of the extended signal using uplink control information. In another example, the eNB detects the start of the extended signal based on the presence of reference signals.

In another example, the eNB signals the possible starting points in the UL transmission. Alternatively, this can be done via DCI or higher layer signaling or both for scheduled UL transmission and autonomous UL transmission. One of the benefits is that UE multiplexing is allowed even though multiple starting transmission points are allowed in UL. Another benefit is that the complexity at eNB and the number of hypotheses to be tested at the eNB are reduced. The corresponding signaled field can be in the form of a bit map to indicate allowed starting points. Alternatively, the corresponding signaled field, in combination with a rule, can assist the UE with determining the starting points for UL transmission.

One example is that the step in the number of symbols between two consecutive starting points is signaled. For example, the starting points may be every X number of symbols, where X can be 2 or 3. The first possible starting point can be signaled or can be considered a default value such as a 1st symbol. Alternatively, the already existing fields in DCI can be used as the first starting point, i.e., 1st or 2nd symbol.

The step X can be signaled via DCI or RRC signaling, or a combination of both. In one example, via higher layers, the UE is signaled with a set of possible steps X, and via DCI, the UE can select one value from the set. In another example, with the help of the DCI signaling and a predefined rule, the UE can determine which steps are valid.

In a further embodiment, the eNB performs autonomous detection of the extended signals by any of various methods. In one example method, the eNB can detect the presence of extended signals by comparing the received signals between slots or between mini-slots. The comparison may be based on: a correlation of the received modulation symbols; a Euclidean distance between the received modulation symbols; a correlation of the bit soft values after soft demodulation; a Euclidean distance between the bit soft values after soft demodulation; a correlation of hard bit decisions from demodulation; and/or a Hamming distance between hard bit decisions from demodulation.

The eNB can detect the presence of DMRS and recover at least the part of the extended signal starting from the DFTS-OFDM symbol containing the detected DMRS. The eNB can also detect the presence of the extended signals by energy detection. The above operation can be limited to the possible candidates starting points if the eNB had signaled to the UE the allowed possible starting points for the data.

Link Adaptation at eNB

In this embodiment, the eNB takes into account the additional transmission time that may be available to the eNB or the UE, depending on when access is gained to the channel, in order to increase the data rate for the UE. In one method, this may be done by basing the link adaptation on an assumed average number for the additional available transmission time. For instance, if the eNB contends for the channel 500 microseconds before the transmission of a slot or subframe of data spanning 1 ms, the eNB may assume that, on average, the additional available transmission time available is 250 microseconds. The eNB may then be able to increase the data rate to the UE, thus delivering a greater amount of information, by using a target modulation and coding scheme assuming the availability of 1.250 milliseconds for transmission.

In another method according to this embodiment, the eNB may use statistics from past attempts at accessing the channel to determine the average amount of excess time it can assume for the purpose of link adaptation. In other methods, instead of using an average, some function of the statistics gathered from the past attempts may be used for purposes of link adaptation, such as the 25th percentile of the duration between the time the channel access is successful and the slot or subframe boundary.

Figure 8:
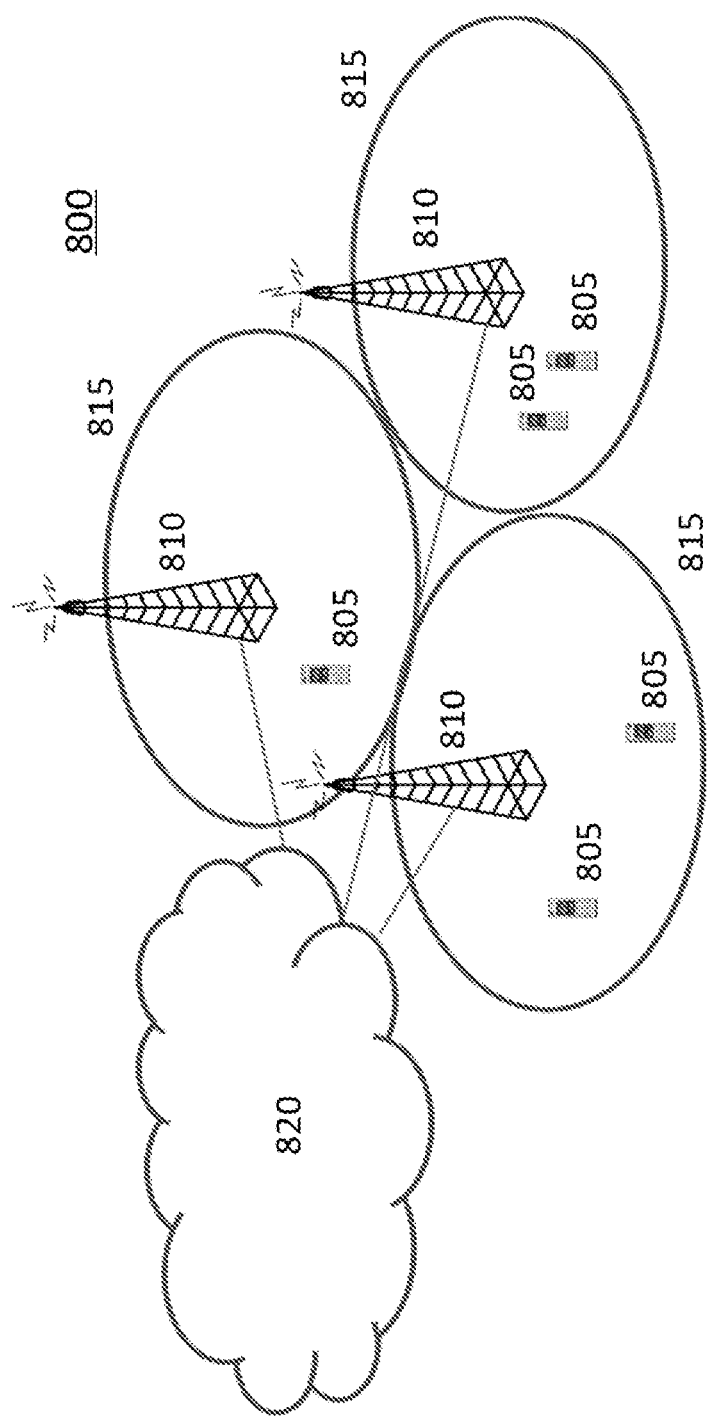
FIG. 8 illustrates a communication system, according to some embodiments of the disclosed subject matter.

The described embodiments may be implemented in any appropriate type of communication system supporting any suitable communication standards and using any suitable components. As one example, certain embodiments may be implemented in a communication system such as what is illustrated in FIG. 8. Although certain embodiments are described with respect to Long Term Evolution (LTE) systems and related terminology, the disclosed concepts are not limited to LTE or a 3GPP system. Additionally, although reference may be made to the term "cell", the described concepts may also apply in other contexts, such as beams used in Fifth Generation (5G) or New Radio (NR) systems, for instance.

Referring to FIG. 8, a communication system 800 comprises a plurality of wireless communication devices 805 (e.g., UEs, machine type communication (MTC)/machine-to-machine (M2M) UEs) and a plurality of radio access nodes 810 (e.g., eNodeBs or other base stations). Communication system 800 is organized into cells 815, which are connected to a core network 820 via corresponding radio access nodes 810. Radio access nodes 810 are capable of communicating with wireless communication devices 805 along with any additional elements suitable to support communication between wireless communication devices or between a wireless communication device and another communication device (such as a landline telephone).

Figure 9B:
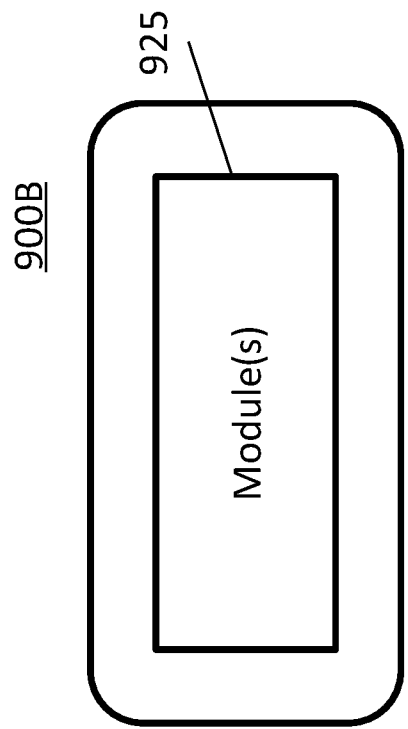
FIG. 9B illustrates a functional implementation of a wireless communication device, according to some embodiments.
Figure 9A:
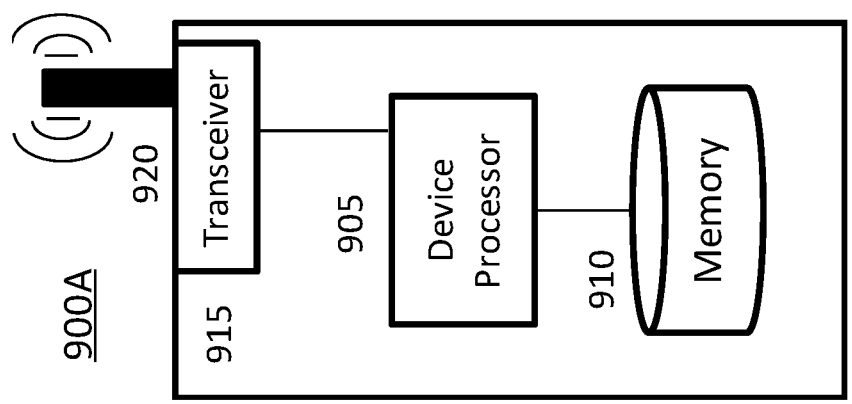
FIG. 9A illustrates a wireless communication device, according to some embodiments.

Although wireless communication devices 805 may represent communication devices that include any suitable combination of hardware and/or software, these wireless communication devices may, in certain embodiments, represent devices such as those illustrated in greater detail by FIGS. 9A and 9B. Similarly, although the illustrated radio access node may represent network nodes that include any suitable combination of hardware and/or software, these nodes may, in particular embodiments, represent devices such those illustrated in greater detail by FIGS. 10A, 10B and 11.

Referring to FIG. 9A, a wireless communication device 900A comprises a processor 905, such as one or more Central Processing Units (CPUs), Application Specific Integrated Circuits (ASICs), Field Programmable Gate Arrays (FPGAs), and/or the like, a memory 910, a transceiver 915, and an antenna 920. In certain embodiments, some or all of the functionality described as being provided by UEs, MTC or M2M devices, and/or any other types of wireless communication devices may be provided by the device processor executing instructions stored on a computer-readable medium, such as memory 910. Alternative embodiments may include additional components beyond those shown in FIG. 9A that may be responsible for providing certain aspects of the device's functionality, including any of the functionality described herein.

Referring to FIG. 9B, a wireless communication device 900B comprises at least one module 925 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 9A.

Figure 10B:
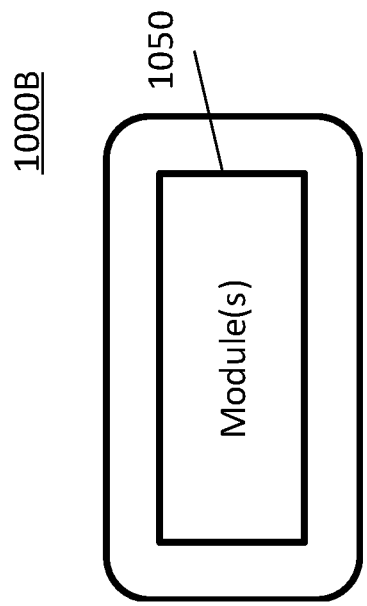
FIG. 10B illustrates a functional implementation of a radio access node, according to some embodiments.
Figure 10A:
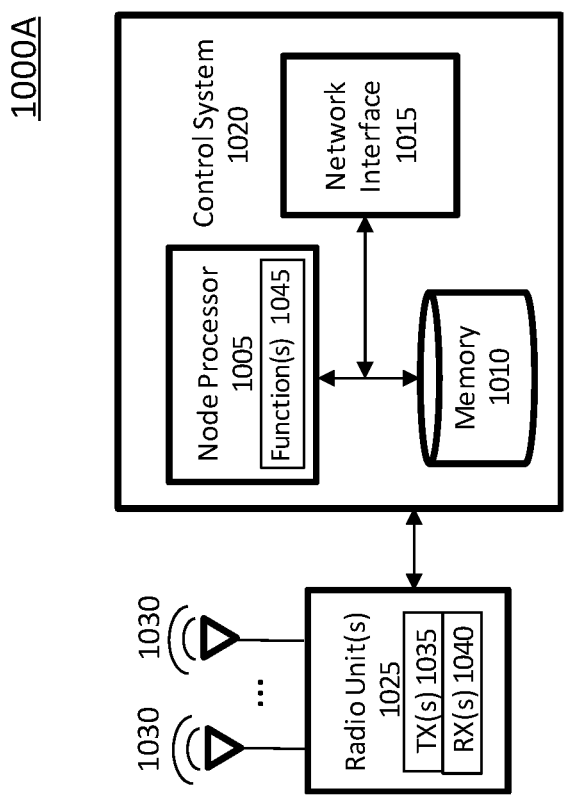
FIG. 10A illustrates a radio access node, according to some embodiments.

Referring to FIG. 10A, a radio access node 1000A comprises a control system 1020 that comprises a node processor 1005 (e.g., CPUs, ASICs, FPGAs and/or the like), memory 1010, and a network interface 1015. In addition, radio access node 1000A comprises at least one radio unit 1025 comprising at least one transmitter 1035 and at least one receiver 1040 coupled to at least one antenna 1030. In some embodiments, radio unit 1025 is external to control system 1020 and connected to control system 1020 via, e.g., a wired connection (e.g., an optical cable). However, in some other embodiments, radio unit 1025 and potentially the antenna 1030 are integrated together with control system 1020. Node processor 1005 operates to provide at least one function 1045 of radio access node 1000A as described herein. In some embodiments, the function(s) are implemented in software that is stored, e.g., in the memory 1010 and executed by node processor 1005.

In certain embodiments, some or all of the functionality described as being provided by a base station, a node B, an enodeB, gNB and/or any other type of network node may be provided by node processor 1005 executing instructions stored on a computer-readable medium, such as memory 1010 shown in FIG. 10A. Alternative embodiments of radio access node 1000A may comprise additional components to provide additional functionality, such as the functionality described herein and/or related supporting functionality.

Referring to FIG. 10B, a radio access node 1000B comprises at least one module 1050 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 10A.

Figure 11:
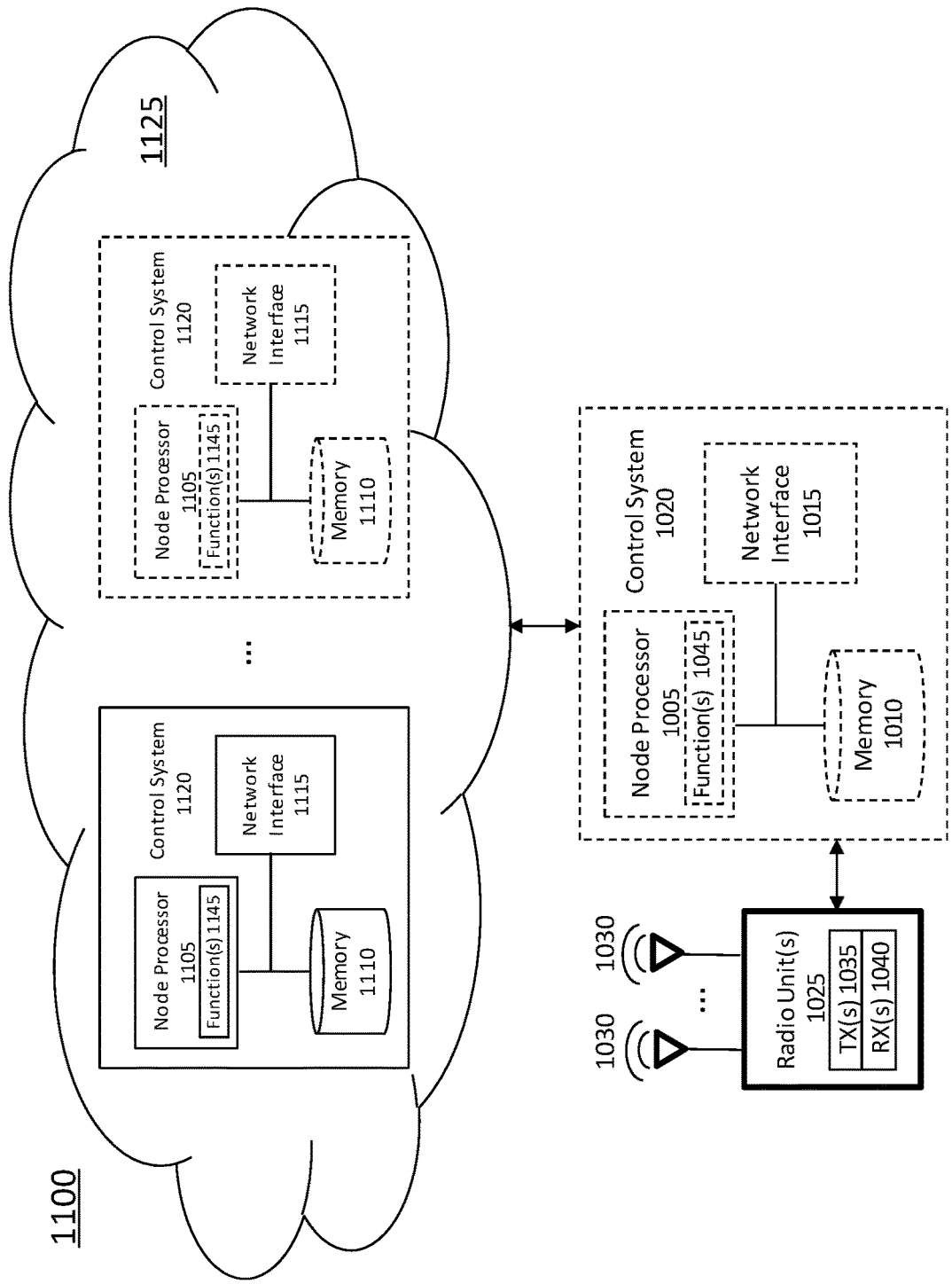
FIG. 11 illustrates a radio access node, according to according to some embodiments.

FIG. 11 is a block diagram that illustrates a virtualized radio access node 1100 according to an embodiment of the disclosed subject matter. The concepts described in relation to FIG. 11 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 11, radio access node 1100 comprises control system 1020 as described in relation to FIG. 10A. Control system 1020 is connected to one or more processing nodes 1120 coupled to or included as part of a network(s) 1125 via network interface 1015. Each processing node 1120 comprises one or more processors 1105 (e.g., CPUs, ASICs, FPGAs and/or the like), memory 1110, and a network interface 1115.

In this example, functions 1045 of radio access node 1000A described herein are implemented at the one or more processing nodes 1120 or distributed across control system 1020 and the one or more processing nodes 1120 in any desired manner. In some embodiments, some or all of the functions 1045 of radio access node 1000A described herein are implemented as virtual components executed by one or more virtual machines implemented in a virtual environment (s) hosted by processing node(s) 1120. As will be appreciated by one of ordinary skill in the art, additional signaling or communication between processing node(s) 1120 and control system 1020 is used in order to carry out at least some of the desired functions 1045. As indicated by dotted lines, in some embodiments control system 1020 may be omitted, in which case the radio unit(s) 1025 communicate directly with the processing node(s) 1120 via an appropriate network interface(s).

In some embodiments, a computer program comprises instructions which, when executed by at least one processor, causes at least one processor to carry out the functionality of a radio access node (e.g., radio access node 810 or 1000A) or another node (e.g., processing node 1120) implementing one or more of the functions of the radio access node in a virtual environment according to any of the embodiments described herein.

Figure 13:
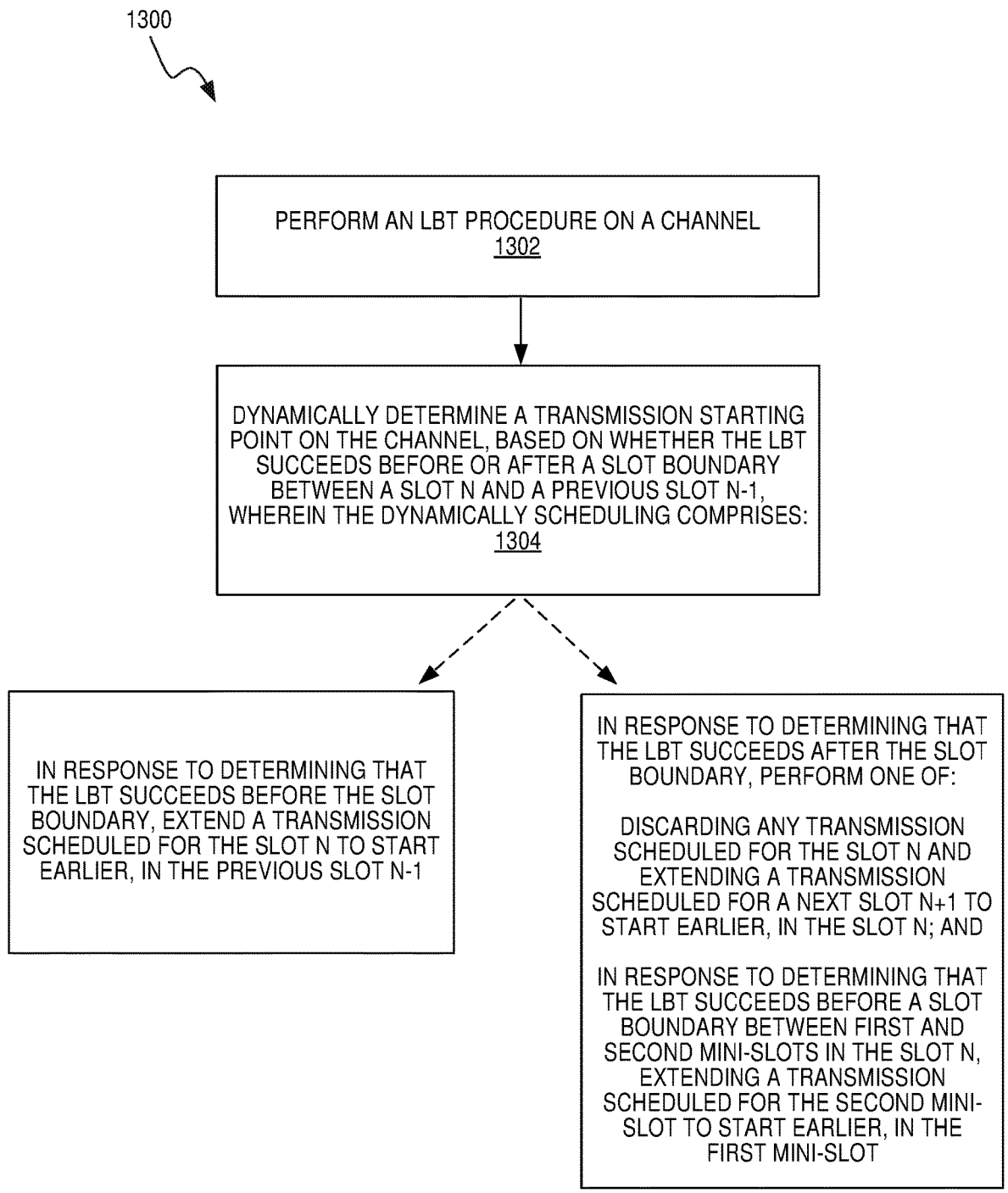
FIG. 13 illustrates another method of operating a wireless communication device or a radio access node, according to some embodiments.

In some embodiments, the processors 905, 1005 of a network node, such as wireless communication device 900A or radio access node 1000A, may be configured to perform a method, such as method 1200 in FIG. 12 or method 1300 in FIG. 13.

Method 1200, shown in FIG. 12, may include determining whether LBT succeeds before a subframe boundary of a subframe "n" (S1205=Yes) and, in response to determining that the LBT succeeds before the subframe boundary, extending a transmission that is scheduled for subframe "n" to start in a subframe "n−1" (S1210). Method 1200 may also include determining whether LBT succeeds after a subframe boundary of a subframe "n" (S1205=No) and, in response to determining that the LBT succeeds after the subframe boundary, discarding a planned transmission for subframe "n" and extending the prepared transmission for "n+1" to start in subframe "n" (S1215). The extending may include copying part of the transmission scheduled for subframe "n" to occupy a channel of the transmission for a time until the subframe boundary. The copied part may comprise a starting "x" OFDM symbols (OS) of the transmission to be sent in subframe "n", an ending "x" OS of the transmission to be sent in subframe "n", or a preconfigured "x" OS of the transmission to be sent in subframe "n", including one or more reference signals.

Method 1300, shown in FIG. 13, may include performing an LBT procedure on a channel (block 1302) and dynamically determining a transmission starting point on the channel, based on whether the LBT succeeds before or after a slot boundary 710 between a slot n 704 and a previous slot n−1 702 (block 1304). The dynamically determining may include, in response to determining that the LBT succeeds before the slot boundary 710, extending a transmission scheduled for the slot n 704 to start earlier, in the previous slot n−1 702.

The dynamically determining may also include in response to determining that the LBT succeeds after the slot boundary 710, performing either one of: (1) discarding any transmission scheduled for the slot n 704 and extending a transmission scheduled for a next slot n+1 706 to start earlier, in the slot n 704; and (2) in response to determining that the LBT succeeds before a mini-slot boundary 750 between first 740 and second 742 mini-slots in the slot n 704, extending a transmission scheduled for the second mini-slot 742 to start earlier, in the first mini-slot 740. The channel may be in an unlicensed spectrum.

In some embodiments, extending the transmission scheduled for the slot n 704 to start earlier may include copying part of the transmission scheduled for the slot n 704 to occupy the channel during a remaining duration of the previous slot n−1 702. The copied part may include one of: one or more OFDM symbols of the transmission scheduled for a starting portion of the slot n 704; one or more OFDM symbols of the transmission scheduled for an ending portion of the slot n 704; and one or more OFDM symbols of the transmission scheduled for the slot n 704 that include one or more reference signals.

In some embodiments, extending the transmission scheduled for the next slot n+1 706 to start earlier may include copying part of the transmission scheduled for the next slot n+1 706 to occupy the channel during a remaining duration of the slot n 704. The copied part may include one of: one or more OFDM symbols of the transmission scheduled for a starting portion of the next slot n+1 706; one or more OFDM symbols of the transmission scheduled for an ending portion of the next slot n+1 706; and one or more OFDM symbols of the transmission scheduled for the next slot n+1 706 that include one or more reference signals.

In some embodiments, extending the transmission scheduled for the second mini-slot 742 to start earlier may include copying part of the transmission scheduled for the second mini-slot 742 to occupy the channel during a remaining duration of the first mini-slot 740. The copied part comprises one of: one or more OFDM symbols of the transmission scheduled for a starting portion of the second mini-slot 742; one or more OFDM symbols of the transmission scheduled for an ending portion of the second mini-slot 742; and one or more OFDM symbols of the transmission scheduled for the second mini-slot 742 that include one or more reference signals.

In some embodiments, the transmission scheduled for the second mini-slot 742 that is to start earlier in the first mini-slot 740 may have a higher coding rate or modulation order than if the LBT succeeded before the slot boundary 710.

In some embodiments, the transmission is an uplink transmission and the method 1300 is performed by wireless communication device 900A. In other embodiments, the transmission is a downlink transmission and the method 1300 is performed by radio access node 1000A. The method 1300 may further include signaling that the transmission is extended. The signaling can include additional details as to how much the transmission is extended, as described above.

As discussed in detail above, the techniques described herein, e.g., as illustrated in the process flow diagrams of FIGS. 12 and 13, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method by a network node, the method comprising:
performing a Listen-Before-Talk (LBT) procedure on a channel; and
dynamically determining a transmission starting point on the channel, based on whether the LBT succeeds before or after a slot boundary between a slot n and a previous slot n−1, wherein the dynamically determining comprises:
in response to determining that the LBT succeeds before the slot boundary, extending a transmission scheduled for the slot n to start earlier, in the previous slot n−1; and
in response to determining that the LBT succeeds after the slot boundary, performing one of:
discarding any transmission scheduled for the slot n and extending a transmission scheduled for a next slot n+1 to start earlier, in the slot n; and
in response to determining that the LBT succeeds before a mini-slot boundary between first and second mini-slots in the slot n, extending a transmission scheduled for the second mini-slot to start earlier, in the first mini-slot.

2. The method of claim 1, wherein extending the transmission scheduled for the slot n to start earlier comprises copying part of the transmission scheduled for the slot n to occupy the channel during a remaining duration of the previous slot n−1.

3. The method of claim 2, wherein the copied part comprises one of: one or more orthogonal frequency division multiplexing (OFDM) symbols of the transmission scheduled for a starting portion of the slot n; one or more OFDM symbols of the transmission scheduled for an ending portion of the slot n; and one or more OFDM symbols of the transmission scheduled for the slot n that include one or more reference signals.

4. The method of claim 1, wherein extending the transmission scheduled for the next slot n+1 to start earlier comprises copying part of the transmission scheduled for the next slot n+1 to occupy the channel during a remaining duration of the slot n.

5. The method of claim 4, wherein the copied part comprises one of: one or more orthogonal frequency division multiplexing (OFDM) symbols of the transmission scheduled for a starting portion of the next slot n+1; one or more OFDM symbols of the transmission scheduled for an ending portion of the next slot n+1; and one or more OFDM symbols of the transmission scheduled for the next slot n+1 that include one or more reference signals.

6. The method of claim 1, wherein extending the transmission scheduled for the second mini-slot to start earlier comprises copying part of the transmission scheduled for the second mini-slot to occupy the channel during a remaining duration of the first mini-slot.

7. The method of claim 6, wherein the copied part comprises one of: one or more orthogonal frequency division multiplexing (OFDM) symbols of the transmission scheduled for a starting portion of the second mini-slot; one or more OFDM symbols of the transmission scheduled for an ending portion of the second mini-slot; and one or more OFDM symbols of the transmission scheduled for the second mini-slot that include one or more reference signals.

8. The method of claim 1, wherein the transmission scheduled for the second mini-slot that is to start earlier in the first mini-slot has a higher coding rate or modulation order than if the LBT succeeded before the slot boundary.

9. A network node, comprising:
communication circuitry configured for sending and receiving transmissions; and
processing circuitry operatively associated with the communication circuitry and configured to:
perform a Listen-Before-Talk (LBT) procedure on a channel; and
dynamically determine a transmission starting point on the channel, based on whether the LBT succeeds before or after a slot boundary between a slot n and a previous slot n−1, wherein the processing circuitry is configured to dynamically determine the transmission starting point by:
in response to determining that the LBT succeeds before the slot boundary, extending a transmission scheduled for the slot n to start earlier, in the previous slot n−1; and
in response to determining that the LBT succeeds after the slot boundary, performing one of:
discarding any transmission scheduled for the slot n and extending a transmission scheduled for a next slot n+1 to start earlier, in the slot n; and
in response to determining that the LBT succeeds before a mini-slot boundary between first and second mini-slots in the slot n, extending a transmission scheduled for the second mini-slot to start earlier, in the first mini-slot.

10. The network node of claim 9, wherein the processing circuitry is configured to extend the transmission scheduled for the slot n to start earlier by copying part of the transmission scheduled for the slot n to occupy the channel during a remaining duration of the previous slot n−1.

11. The network node of claim 10, wherein the copied part comprises one of: one or more orthogonal frequency division multiplexing (OFDM) symbols of the transmission scheduled for a starting portion of the slot n; one or more OFDM symbols of the transmission scheduled for an ending portion of the slot n; and one or more OFDM symbols of the transmission scheduled for the slot n that include one or more reference signals.

12. The network node of claim 9, wherein the processing circuitry is configured to extend the transmission scheduled for the next slot n+1 to start earlier by copying part of the transmission scheduled for the next slot n+1 to occupy the channel during a remaining duration of the slot n.

13. The network node of claim 12, wherein the copied part comprises one of: one or more orthogonal frequency division multiplexing (OFDM) symbols of the transmission scheduled for a starting portion of the next slot n+1; one or more OFDM symbols of the transmission scheduled for an ending portion of the next slot n+1; and one or more OFDM symbols of the transmission scheduled for the next slot n+1 that include one or more reference signals.

14. The network node of claim 9, wherein the processing circuitry is configured to extend the transmission scheduled for the second mini-slot to start earlier by copying part of the transmission scheduled for the second mini-slot to occupy the channel during a remaining duration of the first mini-slot.

15. The network node of claim 14, wherein the copied part comprises one of: one or more orthogonal frequency division multiplexing (OFDM) symbols of the transmission scheduled for a starting portion of the second mini-slot; one or more OFDM symbols of the transmission scheduled for an ending portion of the second mini-slot; and one or more OFDM symbols of the transmission scheduled for the second mini-slot that include one or more reference signals.

16. The network node of claim 9, wherein the transmission scheduled for the second mini-slot that is to start earlier in the first mini-slot has a higher coding rate or modulation order than if the LBT succeeded before the slot boundary.

\* \* \* \* \*